US012686129B2

(12) United States Patent
Subbaiah

(10) Patent No.: US 12,686,129 B2
(45) Date of Patent: Jul. 21, 2026

(54) CONTROL DATA CREATION DEVICE AND CONTROL DATA CREATION METHOD

(71) Applicant: AMADA CO., LTD., Kanagawa (JP)

(72) Inventor: Sivakumar Subbaiah, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 356 days.

(21) Appl. No.: 18/289,199

(22) PCT Filed: May 6, 2022

(86) PCT No.: PCT/JP2022/019547
§ 371 (c)(1),
(2) Date: Nov. 1, 2023

(87) PCT Pub. No.: WO2022/239703
PCT Pub. Date: Nov. 17, 2022

(65) Prior Publication Data
US 2024/0246233 A1      Jul. 25, 2024

(30) Foreign Application Priority Data

May 10, 2021      (JP) ................................. 2021-079857
Mar. 28, 2022      (JP) ................................. 2022-052341

(51) Int. Cl.
*B25J 9/16*                (2006.01)
*B21D 43/28*              (2006.01)
(Continued)

(52) U.S. Cl.
CPC .......... *B25J 9/1679* (2013.01); *B21D 43/287* (2013.01); *B25J 15/0616* (2013.01); *G05B 19/4155* (2013.01); *G05B 2219/32118* (2013.01)

(58) Field of Classification Search
CPC ... B25J 9/1679; B25J 15/0616; B21D 43/287; G05B 19/4155; G05B 2219/32118
(Continued)

(56) References Cited

U.S. PATENT DOCUMENTS 6,055,895 A      5/2000   Kanazawa
2016/0016318 A1*   1/2016   Kawata ................ B25J 15/0633
                                                    294/188
(Continued)

FOREIGN PATENT DOCUMENTS

JP          09-155470 A        6/1997
JP          2014188547 A    * 10/2014
(Continued)

OTHER PUBLICATIONS

English Translation for JP2014188547A (Year: 2025).*
(Continued)

*Primary Examiner* — Mahmoud S Ismail
(74) *Attorney, Agent, or Firm* — Renner, Otto, Boisselle & Sklar, LLP

(57) ABSTRACT

A control data creation device includes a specifying unit configured to change suction positions at which carrying-out arms suction a product P by moving the carrying-out arms on product data so as to specify an index for evaluating a suction state for each of the suction positions, and a layout setting unit configured to create control data in which the suction position is laid out to the product P based on each index specified for each of the suction positions.

17 Claims, 13 Drawing Sheets

(51) Int. Cl.
 *B25J 15/06*    (2006.01)
 *G05B 19/4155*   (2006.01)
(58) Field of Classification Search
 USPC ........................................................ 700/228
 See application file for complete search history.

(56)       References Cited

U.S. PATENT DOCUMENTS

| | | |
|---|---|---|
| 2021/0078811 A1* | 3/2021 | Komoda .............. B25J 15/0052 |
| 2021/0114207 A1 | 4/2021 | Ottnad et al. |

FOREIGN PATENT DOCUMENTS

| | | |
|---|---|---|
| JP | 2016-203201 A | 12/2016 |
| JP | 2021-041513 A | 3/2021 |

OTHER PUBLICATIONS

Extended European Search Report for corresponding EP Application No. 22807405.0, mailed Oct. 8, 2024.
International Search Report for corresponding Application No. PCT/JP2022/019547, mailed Jun. 14, 2022.
Written Opinion for corresponding Application No. PCT/JP2022/019547, mailed Jun. 14, 2022.

\* cited by examiner

X-AXIS
DIRECTION

FRONT

LEFT ←——→ RIGHT

BACK

Y-AXIS DIRECTION

FIG. 13

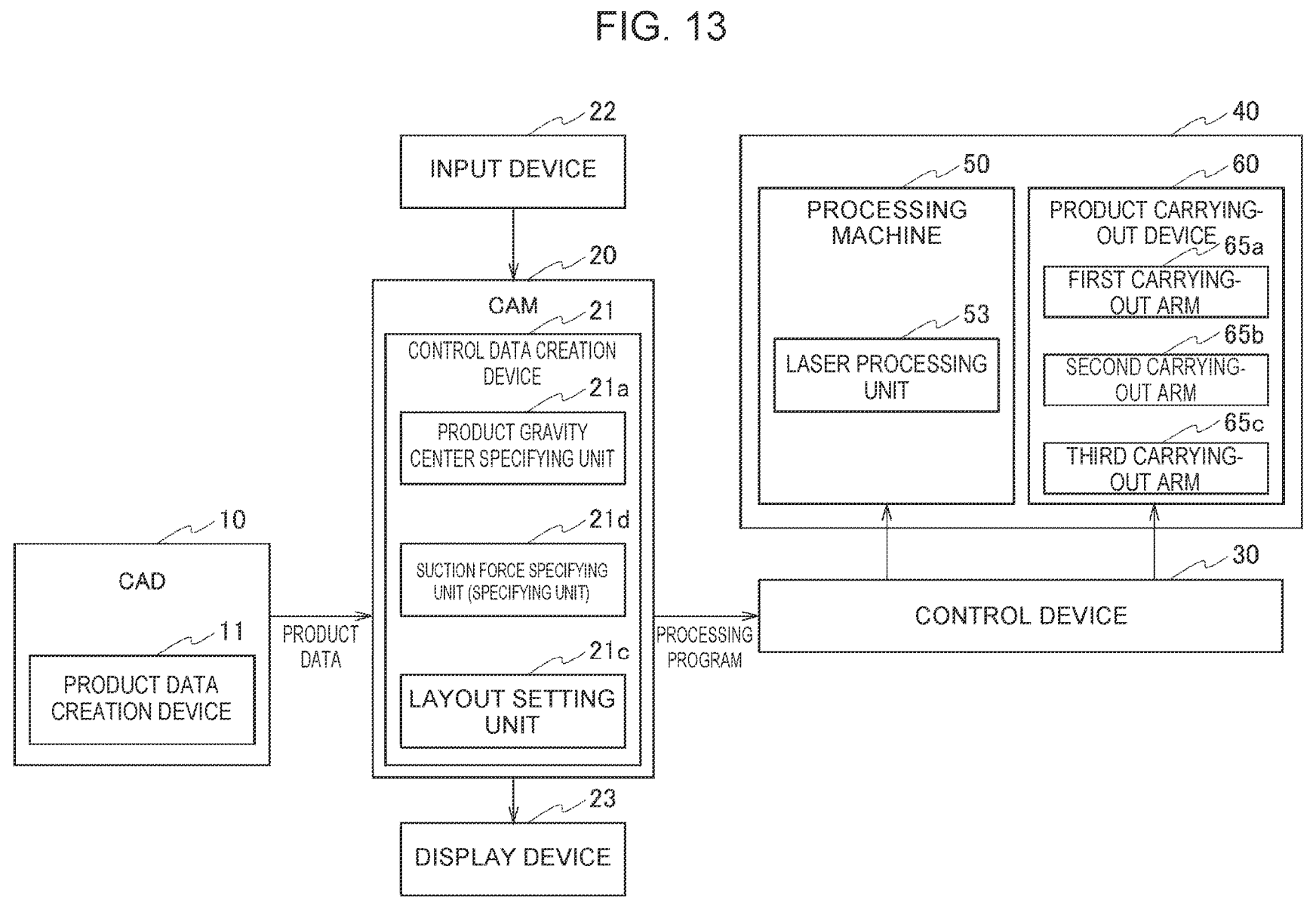

CAD 10

PRODUCT DATA CREATION DEVICE 11

PRODUCT DATA

INPUT DEVICE 22

CAM 20

CONTROL DATA CREATION DEVICE 21

PRODUCT GRAVITY CENTER SPECIFYING UNIT 21a

SUCTION FORCE SPECIFYING UNIT (SPECIFYING UNIT) 21d

LAYOUT SETTING UNIT 21c

DISPLAY DEVICE 23

PROCESSING PROGRAM

CONTROL DEVICE 30

PROCESSING MACHINE 50

LASER PROCESSING UNIT 53

PRODUCT CARRYING-OUT DEVICE 60

FIRST CARRYING-OUT ARM 65a

SECOND CARRYING-OUT ARM 65b

THIRD CARRYING-OUT ARM 65c

CONTROL DATA CREATION DEVICE AND CONTROL DATA CREATION METHOD

CROSS-REFERENCE TO RELATED APPLICATIONS

This application is a national phase of International Application No. PCT/JP2022/019547 filed May 6, 2022, which claims priority to Japan Application No. 2021-079857 filed May 10, 2021, each of which is hereby incorporated herein by reference in its entirety.

TECHNICAL FIELD

The present disclosure relates to a control data creation device and a control data creation method.

BACKGROUND ART

Patent Literature 1 discloses a method of controlling a loader device that transports a plate-shaped workpiece by suctioning the workpiece with pads, in which a stability coefficient relating to a transport state of the workpiece is calculated based on suction positions of the pads to the workpiece to set a transport speed of the workpiece based on the stability coefficient.

CITATION LIST

Patent Literature

Patent Literature 1: Japanese Patent Application Laid-Open Publication No. 2016-203201

SUMMARY

However, according to the conventional method, a suction state to the product is not sufficiently considered when a product cut out from the workpiece is taken out. As a result, the product is slanted or deflected, which results in a problem in that the product is caught in a residual workpiece material.

A control data creation device according to one aspect of the present disclosure is a device for creating control data for a product carrying-out device to take out and carry out a product cut from a plate-shaped workpiece by a processing machine, in which the product carrying-out device is provided with a carrying-out arm configured to be movable along a workpiece plane and provided with a plurality of suction pads for suctioning the product on a surface of the carrying-out arm facing the workpiece. The control data creation device includes a specifying unit configured to change a suction position at which the carrying-out arm suctions the product by moving the carrying-out arm on product data so as to specify an index for evaluating a suction state for each suction position, and a layout setting unit configured to create the control data in which the suction position is laid out to the product based on each index specified for each suction position.

Since the control data creation device of the one aspect of the present disclosure specifies the index for evaluating the suction state for each suction position, it is possible to evaluate the suction state at each suction position. As a result, it is possible to specify the suction position at which an appropriate suction state can be obtained, so that desired control data can be created.

According to the one aspect of the present disclosure, since the product can be appropriately suctioned, it is possible to carry out the product stably without making the product caught in the residual workpiece material.

BRIEF DESCRIPTION OF DRAWINGS

FIG. 1 is a block diagram showing a configuration of a control data creation device and a processing system according to a first embodiment.

FIG. 13 is a block diagram showing a configuration of a control data creation device and a processing system according to a second embodiment.

FIG. 14 is a diagram for illustrating first, second, and third carrying-out arms that constitute the product carrying-out device.

DESCRIPTION OF EMBODIMENT

A control data creation device and a control data creation method according to the present embodiment will be described below with reference to the drawings.

First Embodiment

Figure 1:
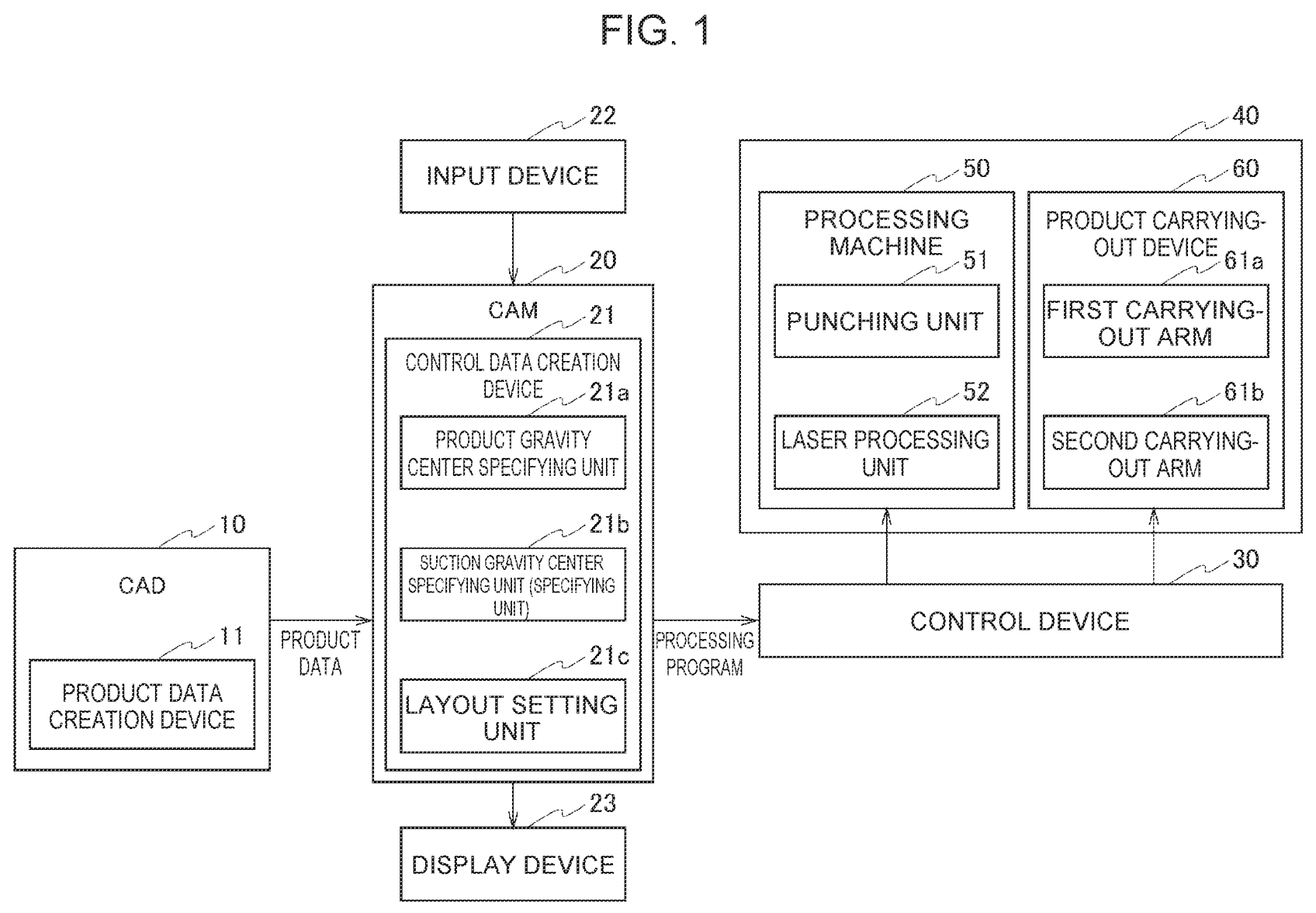
Figure 2:
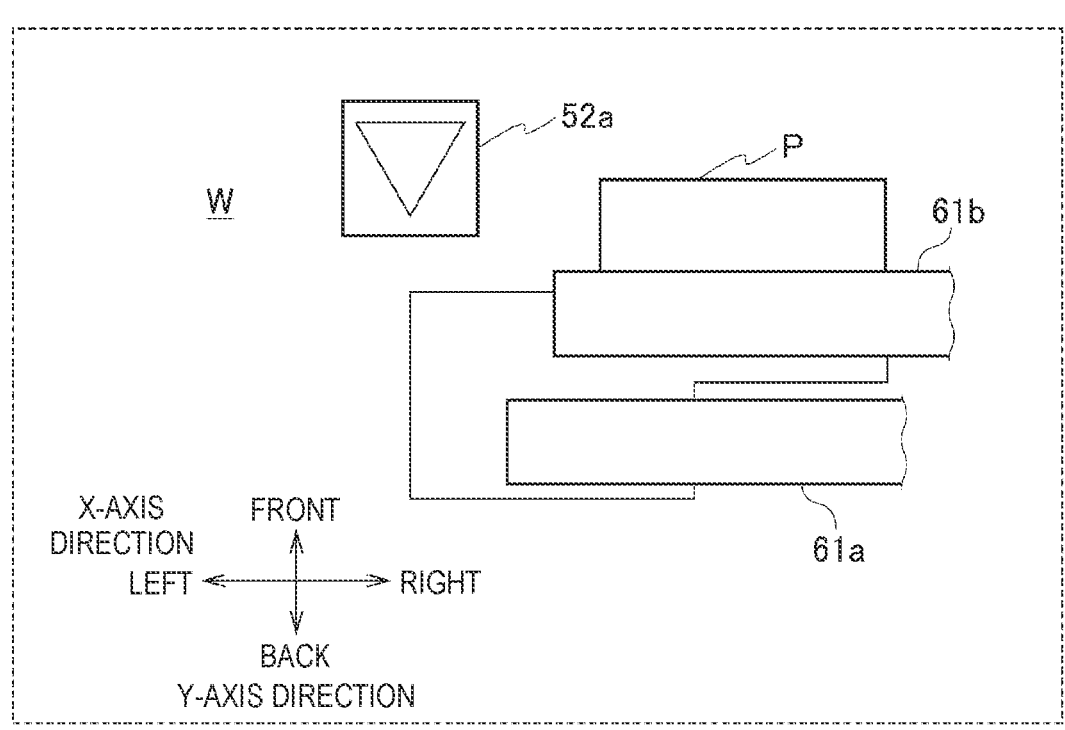
FIG. 2 is an explanatory diagram showing a configuration of the processing system in a simplified manner.
Figure 3:
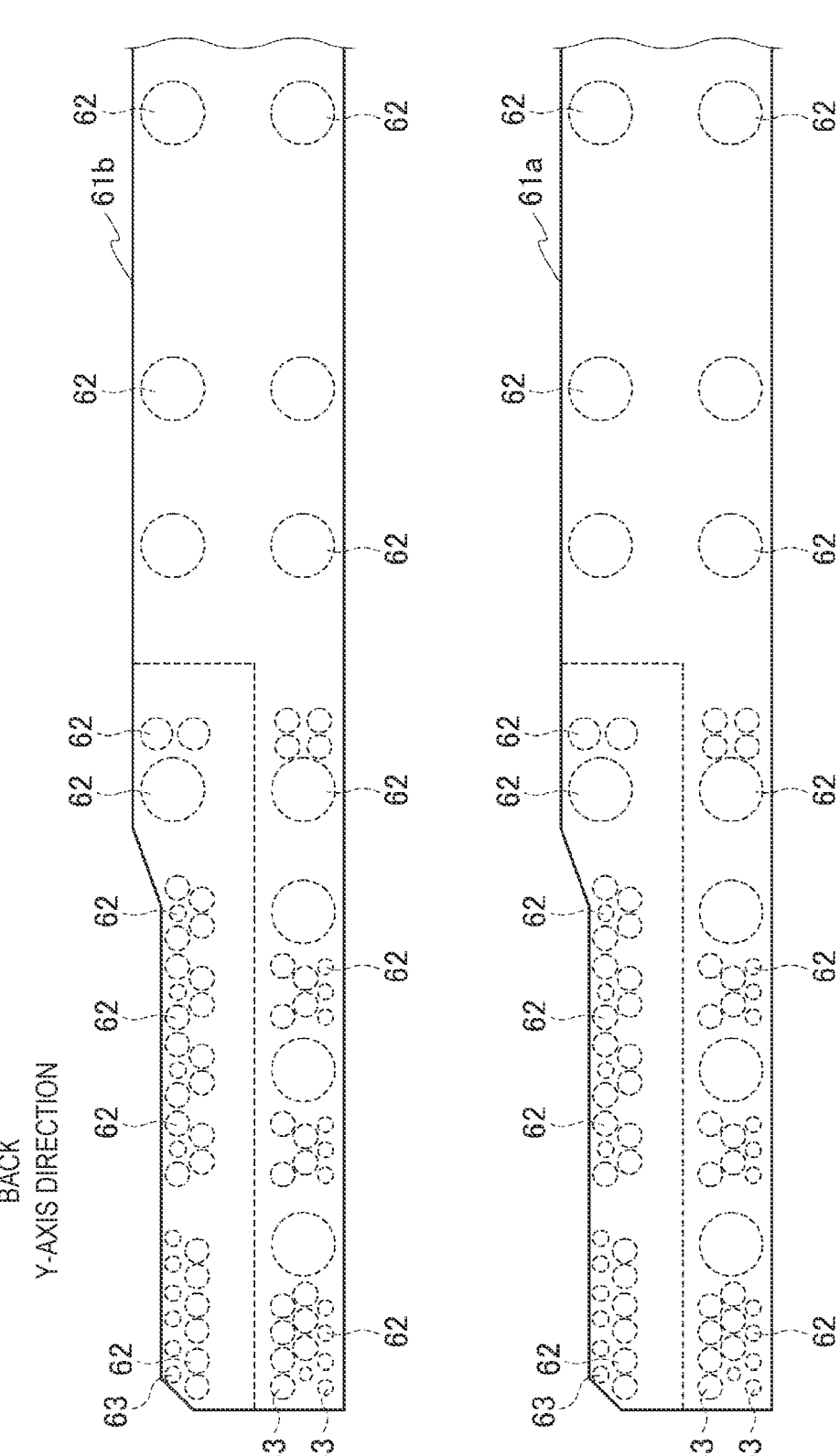
FIG. 3 is an explanatory diagram showing essential parts of carrying-out arms.

FIG. 1 is a block diagram showing a configuration of a control data creation device and a processing system according to a first embodiment. FIG. 2 is an explanatory diagram showing a configuration of the processing system in a simplified manner. FIG. 3 is an explanatory diagram showing essential parts of carrying-out arms. In the following explanation, as definitions of the directions, an X-axis direction (a first axis direction) and a Y-axis direction (a second axis direction) that are perpendicular to each other in the horizontal direction, and a Z-axis direction that is perpendicular to each of the X-axis direction and the Y-axis direction are used. The X-axis direction corresponds to the longitudinal direction, the Y-axis direction corresponds to the lateral direction, and the Z-axis direction corresponds to the vertical direction. Note that these directions are used only for convenience of explanation.

A control data creation device 21 according to the present embodiment is a device for creating control data for a product carrying-out device 60 to take out and carry out a product P that is cut from a plate-shaped workpiece W by a processing machine 50. The product carrying-out device 60 is provided with carrying-out arms 61a and 61b that are configured to be movable along a workpiece plane and provided with a plurality of suction pads 62 for suctioning the product P on surfaces facing the workpiece W. The control data creation device 21 includes a specifying unit configured to change suction positions at which the carrying-out arms 61a and 61b suction the product P by moving the carrying-out arms 61a and 61b on product data so as to specify an index for evaluating a suction state for each of the suction positions, and a layout setting unit 21c configured to create the control data in which the suction position is laid out to the product P based on each index specified for each of the suction positions.

In the present embodiment, the specifying unit includes a suction gravity center specifying unit 21b that specifies, as the index, a suction gravity center that is a gravity center position calculated from a set of the effective suction pads 62a capable of suctioning the product P among the plurality of suction pads 62. The layout setting unit 21c creates the control data such that a distance between the suction gravity center and a product gravity center is reduced.

An overall system that includes the control data creation device and the processing system will be described below. The overall system shown in FIG. 1 is mainly composed of a CAD (Computer Aided Design) 10, a CAM (Computer Aided Manufacturing) 20, a control device 30, and a processing system 40.

The CAD 10 is a computer equipped with a CAD function. The CAD 10 is configured by a computer including a hardware processor such as a CPU (Central Processing Unit), a memory, and various interfaces. The memory and the various interfaces are connected to the hardware processor via buses. Various functions provided to the CAD 10 are realized by causing the hardware processor to execute a program stored in the memory.

The CAD 10 functions as a product data creation device 11 by executing a computer program. The product data creation device 11 creates the product data that is data relating to the product P that is cut from the workpiece W. The product data includes information (graphic data) such as a shape (two-dimensional data indicating the shape of the product P represented on a two-dimensional plane), a size, and a weight of the product P. The product data created by the product data creation device 11 is input to the CAM 20.

The CAM 20 is a computer equipped with a CAM function. The CAM 20 is configured by a computer including a hardware processor such as a CPU, a memory, and various interfaces. The memory and the various interfaces are connected to the hardware processor via buses. Various functions provided to the CAM 20 are realized by causing the hardware processor to execute a program stored in the memory.

An input device 22 for inputting the information to the CAM 20 and a display device 23 for displaying information created by the CAM 20 are connected to the CAM 20. The CAM 20 functions as the control data creation device 21 that creates a processing program for the control device 30 to control the processing system 40 by executing a computer program. Details of the control data creation device 21 will be described later.

The control device 30 is a device that controls the processing system 40 based on the processing program, and is, for example, an NC device (Numerical Control device). The control device 30 is configured by a computer including a hardware processor such as a CPU, a memory, and various interfaces. The memory and the various interfaces are connected to the hardware processor via buses. Various functions provided to the control device 30 are realized by causing the hardware processor to execute a program stored in the memory.

For example, the control device 30 controls the processing machine 50 to cut out the product P from the workpiece W based on the processing program. When the processing machine 50 cuts out the product P from the workpiece W, the product P is manufactured. Further, the control device 30 controls the product carrying-out device 60 to take out and carry out the product P, which is cut from the workpiece W, based on the processing program. When the product carrying-out device 60 carries out the product P, the product P is stacked on a stacking pallet (not shown).

The processing system 40 includes the processing machine 50 and the product carrying-out device 60.

The processing machine 50 is a combination processing machine including a punching unit 51 and a laser processing unit 52. The punching unit 51 punches the workpiece W by way of a tool composed of a punch and a die. The laser processing unit 52 performs laser cutting to the workpiece W by way of a laser beam.

The laser processing unit 52 includes a processing head 52a that irradiates the workpiece W with the laser beam. The processing head 52a is configured to be movable in the Y-axis direction and the Z-axis direction. When the laser cutting is performed, under the control of the control device 30, the processing machine 50 combines a movement of the workpiece W in the X-axis direction and a movement of the processing head 52a in the Y-axis direction to two-dimensionally irradiate the workpiece W with the laser beam output from the processing head 52a. As a result, the laser processing unit 52 cuts the workpiece W in accordance with an internal shape and an outer peripheral shape of the product P.

The product carrying-out device 60 takes out and carries out the product P that is cut out from the workpiece W. The product P is carried out by the product carrying-out device 60 each time the product P is cut out from the workpiece W by the laser processing unit 52. The product carrying-out device 60 is provided with the first and second carrying-out arms 61a and 61b that take out the product P after separating the product P, which is cut out from the workpiece W, from a residual workpiece material.

Each of the carrying-out arms 61a and 61b is provided with the plurality of suction pads 62 for suctioning the product P. The plurality of suction pads 62 are arranged on surfaces facing the workpiece W in the carrying-out arms 61a and 61b. The plurality of suction pads 62 include multiple types of suction pads with different pad diameters. Further, a plurality of sensors 63 for detecting a presence or an absence of the product P are arranged on the surface facing the workpiece W on a tip end side of each of the carrying-out arms 61*a* and 61*b*.

When the product P is carried out, under the control of the control device 30, the product carrying-out device 60 moves the first and second carrying-out arms 61*a* and 61*b* to the left in the X-axis direction, and advances the carrying-out arms 61*a* and 61*b* toward the processing head 52*a*. When the first and second carrying-out arms 61*a* and 61*b* reach the product P, the product carrying-out device 60 suctions the product P by using the first and second carrying-out arms 61*a* and 61*b*, and takes out the product P after separating the product P from the residual workpiece material. The product carrying-out device 60 carries out the product P, which is taken out, to the stacking pallet (not shown) for stacking.

A configuration of the control data creation device 21, which is one of the features of the present embodiment, will be described below. The product data created by the product data creation device 11 is input to the control data creation device 21. Workpiece data including the size, a thickness, a material, and the like of the workpiece W is input from the input device 22 to the control data creation device 21. Device data including information on the product carrying-out device 60 of the processing system 40 is input to the control data creation device 21. The device data may be acquired from the product carrying-out device 60 or the control device 30, or may be acquired from an external device that holds the information on the processing system 40.

The control data creation device 21 creates the control data for the product carrying-out device 60 to take out and carry out the product P cut off from the workpiece W by the processing machine 50. The control data is data in which the suction positions at which the first and second carrying-out arms 61*a* and 61*b* suction the product P are laid out to the product P. The control data creation device 21 creates the processing program based on the control data. The processing program is composed of a machine control code for the control device 30 to control the processing system 40.

The processing program created by the control data creation device 21 is stored in the control device 30. Note that the control data creation device 21 may store the created processing program in a database in a data management server (not shown). In this case, the control device 30 may read the processing program stored in the database of the data management server.

In relation to the present embodiment, the control data creation device 21 includes a product gravity center specifying unit 21*a*, the suction gravity center specifying unit 21*b*, and the layout setting unit 21*c*. The product gravity center specifying unit 21*a* acquires the product data from the product data creation device 11. The product gravity center specifying unit 21*a* specifies the product gravity center that is a gravity center position of the product P based on the product data. The suction gravity center specifying unit 21*b* changes the suction positions at which the first and second carrying-out arms 61*a* and 61*b* suction the product P while moving the first and second carrying-out arms 61*a* and 61*b* on the product data (the data indicating the shape of the product P represented on the two-dimensional plane). The suction gravity center specifying unit 21*b* specifies, for each of the suction positions, the effective suction pad capable of suctioning the product P from among the plurality of suction pads 62 so as to specify, as the suction gravity center, the gravity center position calculated from the set of the suction pads. The layout setting unit 21*c* creates the control data in which the suction positions of the first and second carrying-out arms 61*a* and 61*b* are laid out to the product P such that the distance between the suction gravity center and the product gravity center is reduced.

Note that the layout setting unit 21*c* can not only create the control data in which the suction positions are laid out but also create the processing data of the product P necessary for the laser cutting of the processing machine 50 by laying out, on the workpiece W, a cutting line and a cutting path of the laser beam for cutting the product P based on the product data.

Figure 4:
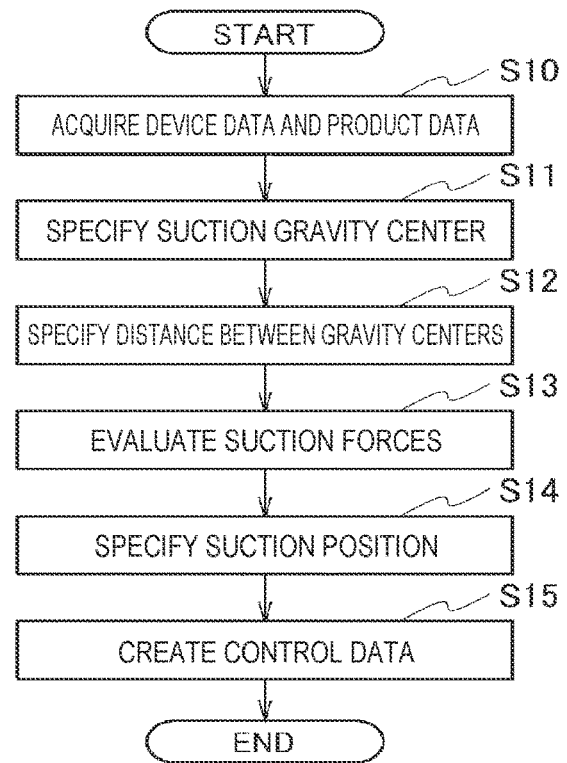
FIG. 4 is a flowchart showing a method of laying out suction positions of the carrying-out arms to the product.

Next, a procedure for the control data creation device 21 to create the control data will be described. FIG. 4 is a flowchart showing a method of laying out the suction positions of the carrying-out arms to the product.

In step S10, the control data creation device 21 acquires the device data and the product data. The control data creation device 21 can recognize the number of the suction pads 62 provided to each of the carrying-out arms 61*a* and 61*b*, the position of each of the suction pads 62 on the arm, the pad diameter, and the like through the device data. Further, the control data creation device 21 can recognize the shape, the size, and the like of the product P through the product data.

Figure 5:
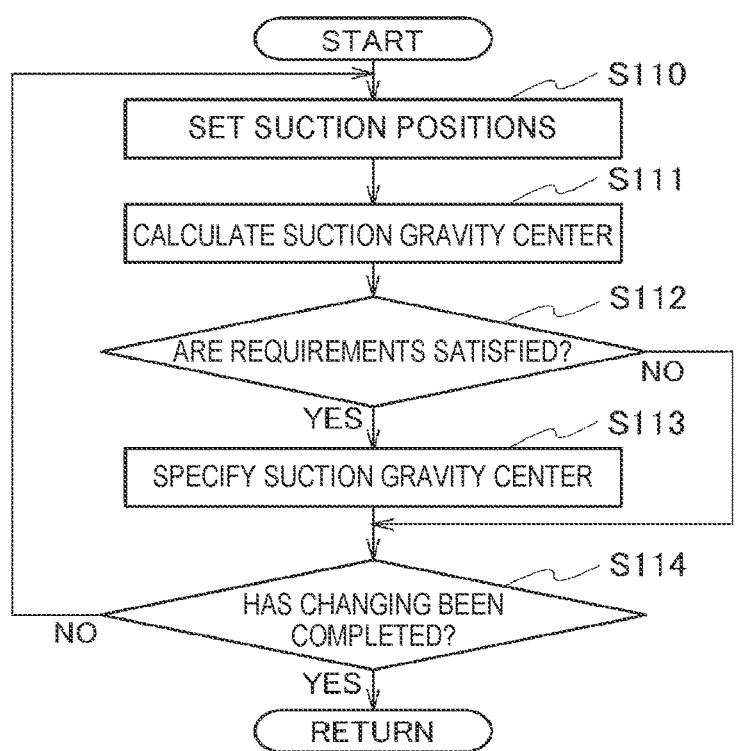
FIG. 5 is a flowchart showing a procedure for specifying a suction gravity center for each suction position.

In step S11, the suction gravity center specifying unit 21*b* specifies the suction gravity center. FIG. 5 is a flowchart showing a procedure for specifying the suction gravity center for each suction position.

First, in step S110, the suction gravity center specifying unit 21*b* sets the suction positions at which the first and second carrying-out arms 61*a* and 61*b* suction the product P. In the present embodiment, since it is preferable to specify the suction gravity centers for various suction positions on the product data, the suction positions of the first and second carrying-out arms 61*a* and 61*b* are set a plurality of times while locations are being changed. A method of changing the suction positions of the first and second carrying-out arms 61*a* and 61*b* will be described below with reference to FIGS. 6 to 9. FIGS. 6 to 9 are diagrams for illustrating the method of changing the suction positions of the carrying-out arms on the product data.

Figure 6:
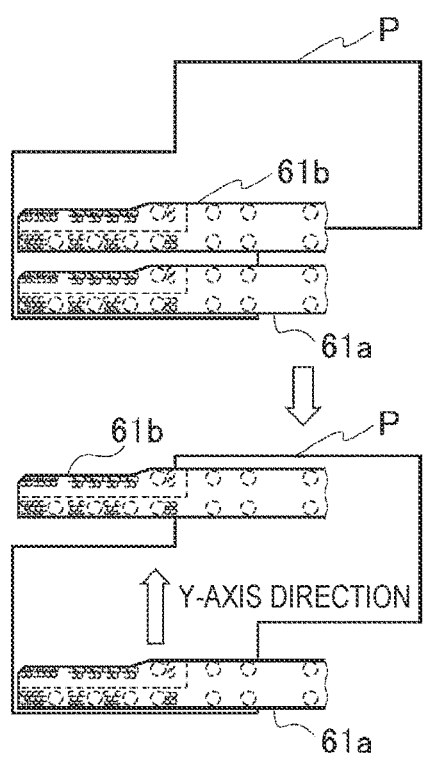
FIG. 6 is a diagram for illustrating a method of changing the suction positions of the carrying-out arms on product data.

First, as shown in FIG. 6, the suction gravity center specifying unit 21*b* sets the suction positions of the first and second carrying-out arms 61*a* and 61*b* to a first reference position. The first reference position is set, for example, to a corner of the product P shown in FIG. 6. Specifically, the corner of the product P corresponds to a left side, to which the first and second carrying-out arms 61*a* and 61*b* advance, and to a rear side, on which the first carrying-out arm 61*a* of the first and second carrying-out arms 61*a* and 61*b* is located. In other words, the corner of the product P corresponds to the lower left of the product P in FIG. 6. After setting the first and second carrying-out arms 61*a* and 61*b* to the first reference position, the suction gravity center specifying unit 21*b* moves the second carrying-out arm 61*b* along the Y-axis direction at a constant pitch, thereby changing the suction position of the second carrying-out arm 61*b*. The movement of the second carrying-out arm 61*b* in the Y-axis direction is repeated until the second carrying-out arm 61*b* reaches an end position in the Y-axis direction in the product P.

The pitch for moving the second carrying-out arm 61*b* in the Y-axis direction can be set in accordance with an area of the product P, for example. For example, the larger the area of the product P, the larger the pitch of the movement of the second carrying-out arm 61*b* in the Y-axis direction. The method of determining the pitch is the same even for a movement in the X-axis direction, which will be described later.

Figure 7:
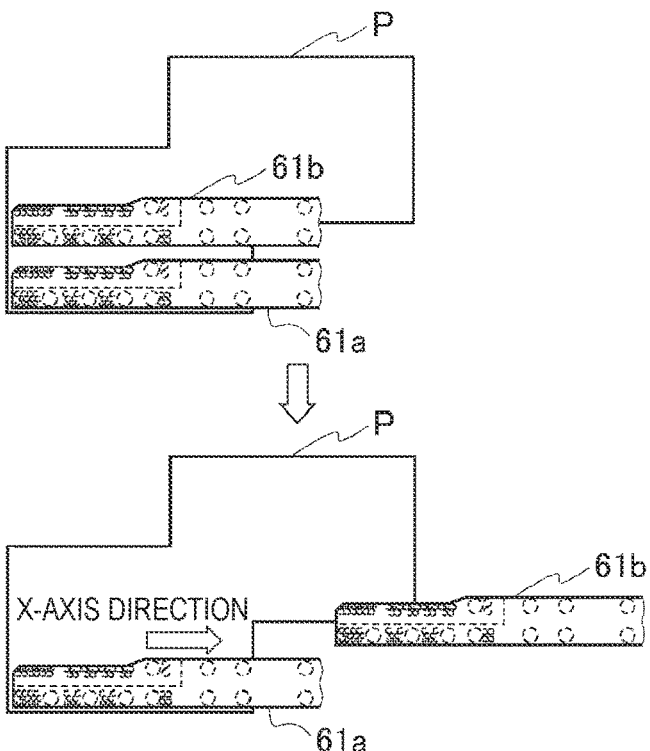
FIG. 7 is a diagram for illustrating the method of changing the suction positions of the carrying-out arms on the product data.

When the second carrying-out arm 61*b* reaches the end position in the Y-axis direction in the product P, the suction gravity center specifying unit 21*b* returns the second carrying-out arm 61*b* to the first reference position, as shown in FIG. 7. Then, the suction gravity center specifying unit 21*b* changes the suction position of the second carrying-out arm 61*b* by moving the second carrying-out arm 61*b* along the X-axis direction at the constant pitch.

Figure 8:
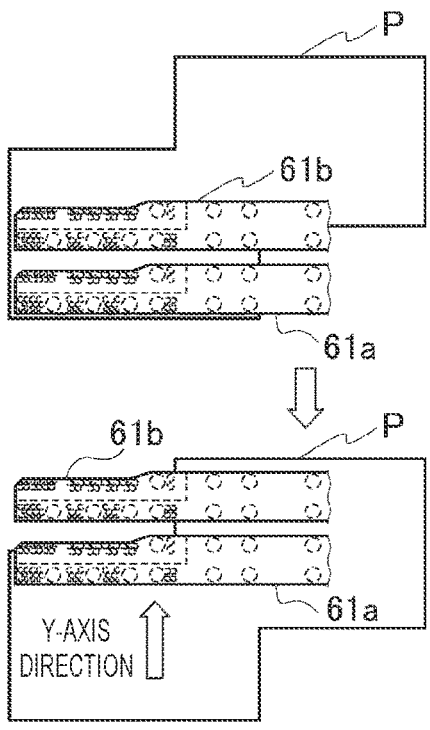
FIG. 8 is a diagram for illustrating the method of changing the suction positions of the carrying-out arms on the product data.

When the second carrying-out arm 61*b* reaches an end position in the X-axis direction in the product P, the suction gravity center specifying unit 21*b* moves the first and second carrying-out arms 61*a* and 61*b* to a second reference position (an initial position) as shown in FIG. 8. The second reference position is a position that is offset from the first reference position by a certain distance in the Y-axis direction. As shown in FIGS. 6 and 7, the suction gravity center specifying unit 21*b* moves the second carrying-out arm 61*b* along the Y-axis direction and the X-axis direction at the constant pitch so as to change the suction position of the second carrying-out arm 61*b*. Then, the suction gravity center specifying unit 21*b* performs the changing of the suction position shown in FIGS. 6 and 7 until the second reference position reaches the position in the Y-axis direction in the product P while updating the second reference position along the Y-axis direction.

Figure 9:
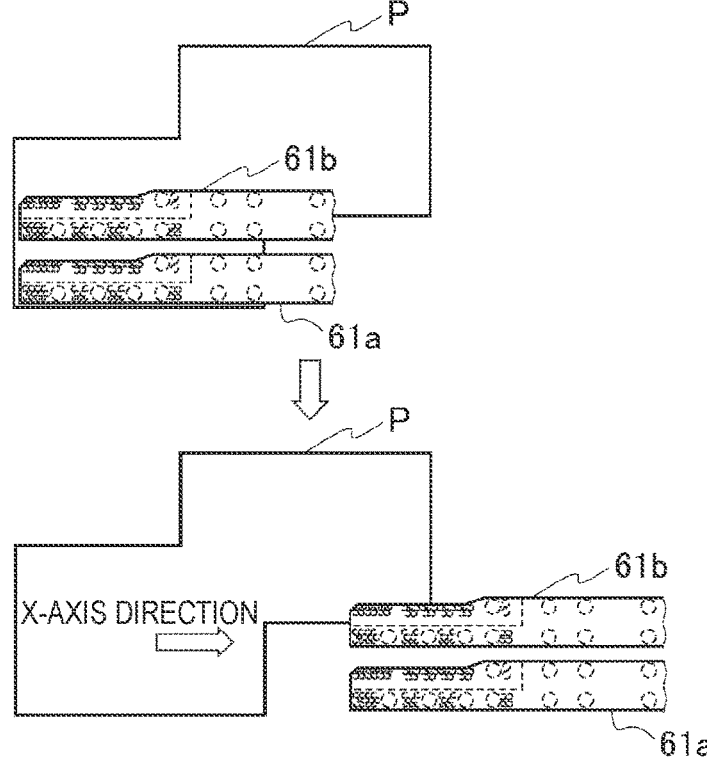
FIG. 9 is a diagram for illustrating the method of changing the suction positions of the carrying-out arms on the product data.

When the second reference position reaches the end position in the Y-axis direction in the product P, the suction gravity center specifying unit 21*b* moves the first and second carrying-out arms 61*a* and 61*b* to a third reference position, as shown in FIG. 9. The third reference position is a position that is offset from the first reference position in the X-axis direction by a certain distance. As shown in FIGS. 6 and 7, the suction gravity center specifying unit 21*b* moves the second carrying-out arm 61*b* along the Y-axis direction and the X-axis direction at the constant pitch so as to change the suction position of the second carrying-out arm 61*b*. Then, the suction gravity center specifying unit 21*b* performs the changing of the suction position shown in FIGS. 6 and 7 until the reference position reaches the end position in the X-axis direction in the product P while updating the reference position along the X-axis direction.

Figure 10:
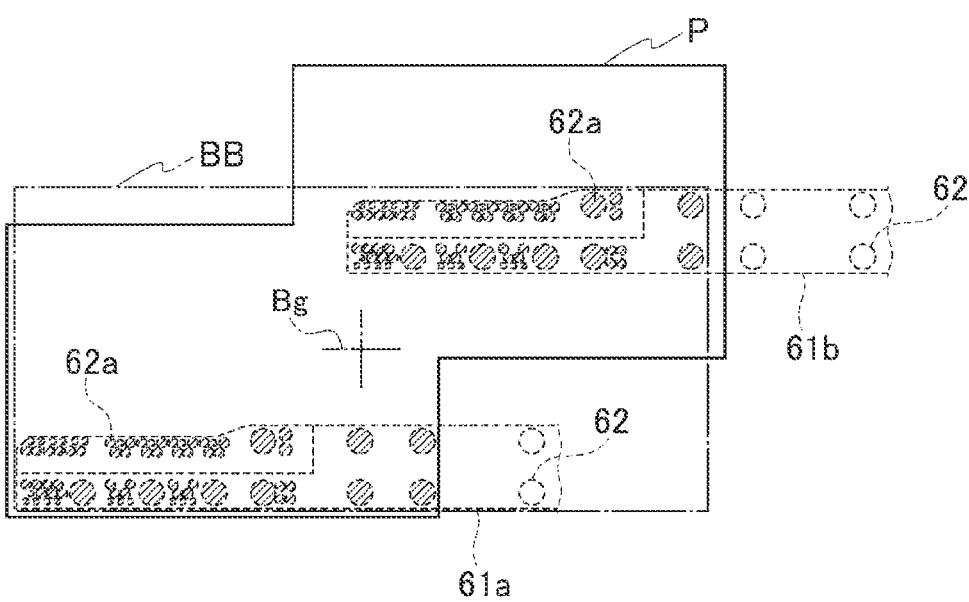
FIG. 10 is a diagram for illustrating an effective suction pad and a suction gravity center.

FIG. 10 is a diagram for illustrating the effective suction pad and the suction gravity center. When the suction positions of the first and second carrying-out arms 61*a* and 61*b* are changed as described above, the suction gravity center specifying unit 21*b* calculates a suction gravity center Bg for each of the suction positions (step S111). The suction gravity center Bg is the gravity center position calculated from the set of the effective suction pads 62*a* capable of suctioning the product P of all the suction pads 62 provided to the first and second carrying-out arms 61*a* and 61*b*.

Specifically, the suction gravity center specifying unit 21*b* specifies, as the effective suction pads 62*a*, the suction pads 62 existing inside an outer peripheral line that defines the outer peripheral shape of the product P of all the suction pads 62 provided to the first and second carrying-out arms 61*a* and 61*b*. In FIG. 10, a plurality of the effective suction pads 62*a* are specified as indicated by hatching.

The suction gravity center specifying unit 21*b* generates a bounding box BB that is a frame body in a rectangular shape that is circumscribed on the effective suction pad 62*a*. The suction gravity center specifying unit 21*b* calculates a gravity center position of the bounding box BB as the suction gravity center Bg.

Note that the method of calculating the suction gravity center Bg is not limited to the method that uses the bounding box BB. For example, since a suction force of the effective suction pad 62*a* depends on the pad diameter of the effective suction pad 62*a*, the suction gravity center Bg may be calculated by using a calculation expression for the gravity center shown below.

$$xg = (r1 \cdot x1 + \ldots \, rn \cdot xn)/(r1 + \ldots \, + rn)$$

$$yg = (r1 \cdot x1 + \ldots \, rn \cdot xn)/(r1 + \ldots \, + rn)$$

Here, "xg" is the X-axis coordinate of the suction gravity center Bg, and "yg" is the Y-axis coordinate of the suction gravity center Bg. Then, x1 to xn are the X-axis coordinates of the n effective suction pads 62*a*, respectively, and y1 to yn are the Y-axis coordinates of the n effective suction pads 62*a*, respectively. Further, r1 to rn are the pad diameters of the n effective suction pads 62*a*, respectively. In this manner, the suction gravity center Bg may be calculated in consideration of the coordinate positions and the suction force of each of the effective suction pads 62*a*.

Figure 11:
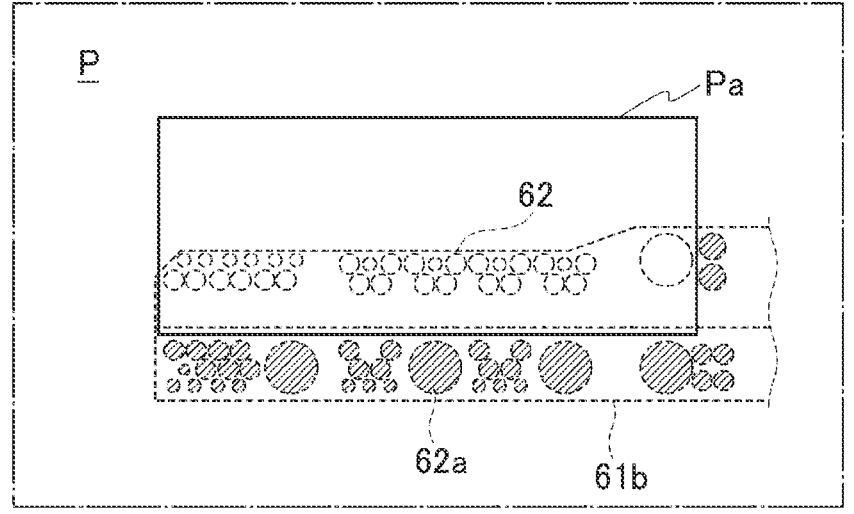
FIG. 11 is a diagram for illustrating the effective suction pad.

FIG. 11 is a diagram for illustrating the effective suction pad. Depending on the product P, a hole Pa in a desired shape may be provided to an inside the product P. In this case, the suction gravity center specifying unit 21*b* does not handle the suction pad 62 in which a whole or a part of the suction pad 62 interferes with the hole Pa as the effective suction pad 62*a* even when that suction pad 62 exists inside the outer peripheral line of the product P. As a result, only the suction pad 62 that contributes to the suction to the product P can be handled as the effective suction pad 62*a*.

Further, the suction gravity center specifying unit 21*b* calculates a total suction force obtained from the set of the effective suction pads 62*a*. As described above, the suction force of the suction pad 62 depends on the pad diameter of the effective suction pad 62*a*. The suction gravity center specifying unit 21*b* specifies the suction force from the pad diameter of the effective suction pad 62*a* by using a map or a calculation expression. Then, the suction gravity center specifying unit 21*b* calculates the total suction force by summing the suction forces of the effective suction pads 62*a*.

Furthermore, the suction gravity center specifying unit 21*b* calculates a deflection amount that is generated in the product P in a state of being suctioned by the first and second carrying-out arms 61*a* and 61*b*. For example, the suction gravity center specifying unit 21*b* obtains a length to a free end at which the deflection is generated based on the suction positions of the first and second carrying-out arms 61*a* and 61*b*. Then, the suction gravity center specifying unit 21*b* calculates the deflection amount based on the length to the free end, a Young's modulus of the workpiece W, and a moment of inertia of area.

In step S112 shown in FIG. 5, the suction gravity center specifying unit 21*b* determines whether or not the following three requirements are satisfied. The first requirement is that at least one sensor 63 among the plurality of sensors 63 provided to each of the carrying-out arms 61*a* and 61*b* detects the product P. The second requirement is that the total suction force by the set of the effective suction pads 62*a* is larger than a weight of the product P. The third requirement is that the deflection amount generated in the product P is within an allowable deflection amount set in advance.

If all of the three requirements are satisfied (step S112: YES), the suction gravity center specifying unit 21*b* specifies the suction gravity center Bg that corresponds to the suction positions of the first and second carrying-out arms $61a$ and $61b$ from the calculation result of step S111 (step S113). At this time, the suction gravity center specifying unit $21b$ associates the suction gravity center Bg and the total suction force with the suction positions of the first and second carrying-out arms $61a$ and $61b$, and stores these pieces of information. On the other hand, if any one of the three requirements is not satisfied (S112: NO), the suction gravity center specifying unit $21b$ does not specify the calculation result of step S111 as the suction gravity center Bg that corresponds to the suction positions of the first and second carrying-out arms $61a$ and $61b$, and proceeds to the next processing. In this manner, the suction gravity center specifying unit $21b$ performs the processing of specifying and storing (collecting) the suction gravity center Bg for the suction positions that satisfy the requirements described above.

In step S114, the suction gravity center specifying unit $21b$ determines whether or not the changing of the suction positions of the first and second carrying-out arms $61a$ and $61b$ has been completed. If all of the changing processes shown in FIGS. 6 to 9 have been completed, the present routine is ended (S114: YES). On the other hand, if all of the changing processes shown in FIGS. 6 to 9 have not been completed, the process returns to the processing of step S110 to set (change) the suction positions of the first and second carrying-out arms $61a$ and $61b$.

Figure 12:
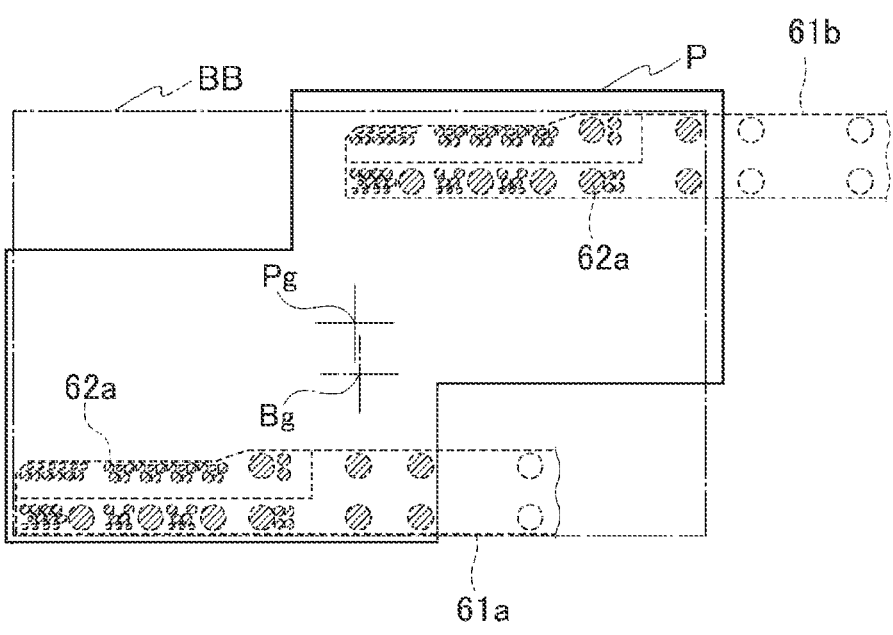
FIG. 12 is a diagram for illustrating a distance between a product gravity center and the suction gravity center.

FIG. 12 is a diagram for illustrating the distance between the product gravity center and the suction gravity center. In step S12, the product gravity center specifying unit $21a$ specifies a product gravity center Pg, which is the gravity center position of the product P, based on the product data. On the other hand, the layout setting unit $21c$ specifies the distance between the suction gravity center Bg specified for each of the suction positions and the product gravity center Pg. Then, the layout setting unit $21c$ specifies a suction position at which the distance between the suction gravity center Bg and the product gravity center Pg is the smallest.

In step S13, when there are a plurality of the suction positions at which the distance between the suction gravity center Bg and the product gravity center Pg is the smallest, the layout setting unit $21c$ evaluates the total suction force calculated at each of the suction positions. Then, the layout setting unit $21c$ specifies the suction position at which the total suction force is the highest among the plurality of the suction positions.

In step S14, the layout setting unit $21c$ specifies the suction positions of the first and second carrying-out arms $61a$ and $61b$ to be laid out to the product P. Specifically, if a single suction position is determined at which the distance between the suction gravity center Bg and the product gravity center Pg is the smallest, the layout setting unit $21c$ specifies this suction position. On the other hand, if there are the plurality of the suction positions at which the distance between the suction gravity center Bg and the product gravity center Pg is the smallest, the layout setting unit $21c$ specifies the suction position at which the total suction force is the highest.

In step S15, the layout setting unit $21c$ creates the control data by laying out the specified suction positions of the first and second carrying-out arms $61a$ and $61b$ to the product P.

When the control data is created in this manner, the control data creation device 21 creates the processing program based on the control data of the suction positions and the processing data of the product P. The created processing program is used by the control device 30.

The control device 30 controls the processing machine 50 and the product carrying-out device 60 based on the processing program. As a result, the processing machine 50 cuts the workpiece W in accordance with the internal shape and the outer peripheral shape of the product P by using the laser beam emitted from the processing head $52a$ of the laser processing unit 52.

When the outer peripheral shape of the product P is cut by the laser beam, the product P is completely cut off from the workpiece W. The product carrying-out device 60 moves the first and second carrying-out arms $61a$ and $61b$ to the left in the X-axis direction so as to be advanced toward the processing head $52a$. When the product carrying-out device 60 advances the first and second carrying-out arms $61a$ and $61b$ to the suction positions, a suction operation by the suction pads 62 is started to take out the product P after separating the product P from the residual workpiece material. The product carrying-out device 60 carries out the product P, which is taken out, to the stacking pallet (not shown) for the stacking.

Through such a series of steps, the laser cutting method according to the present embodiment is realized. The present laser cutting method is performed each time the product P laid out to the workpiece W is cut.

According to the control data creation device 21 according to the present embodiment, the layout setting unit $21c$ creates the control data in which the suction positions of the first and second carrying-out arms $61a$ and $61b$ are laid out to the product P based on the suction gravity center Bg specified for each of the suction positions.

According to this configuration, since the suction positions of the first and second carrying-out arms $61a$ and $61b$ can be set in consideration of the suction gravity center Bg, it is possible to suction the product P appropriately. Since the product P can be appropriately suctioned, it is possible to carry out the product P stably without making the product P caught in the residual workpiece material.

According to the present embodiment, the layout setting unit $21c$ creates the control data based on the suction position at which the distance between the suction gravity center Bg and the product gravity center Pg is the smallest. As a result, it is possible to suction the product P at the most balanced position. Since the product P can be suctioned in a well-balanced manner, it is possible to carry out the product P stably without making the product P caught in the residual workpiece material.

According to the present embodiment, the layout setting unit $21c$ creates the control data such that the distance between the suction gravity center Bg and the product gravity center Pg is reduced and the suction force of the product P is increased. As a result, the product P can be suctioned in a well-balanced manner and the product P can be suctioned with the high suction force. As a result, it is possible to carry out the product P stably.

According to the present embodiment, the suction gravity center specifying unit $21b$ performs the processing of specifying the suction gravity center Bg for the suction position at which the total suction force is larger than the weight of the product P. Therefore, since the suction gravity center Bg is not specified at the suction position at which the product P cannot be suctioned, it is possible to prevent unnecessary data from being accumulated.

According to the present embodiment, the suction gravity center specifying unit $21b$ performs the processing of specifying the suction gravity center Bg for the suction position at which at least one sensor 63 among the plurality of sensors 63 can detect the product P. If the product P is not detected by all of the plurality of sensors 63, the suction operation by the first and second carrying-out arms $61a$ and 61b is not executed. Therefore, since the suction gravity center Bg is not specified at the suction position at which the suction operation by the first and second carrying-out arms 61a and 61b is not performed, it is possible to prevent the unnecessary data from being accumulated.

According to the present embodiment, the suction gravity center specifying unit 21b performs the processing of specifying the suction gravity center Bg for the suction position at which the deflection amount of the product P is within the allowable deflection amount set in advance. According to this configuration, since the suction gravity center Bg is not specified at the suction position at which the deflection of the product P causes interference with the workpiece W, it is possible to prevent the unnecessary data from being accumulated.

Note that in the embodiment described above, an example is shown in which one product P is suctioned by the two carrying-out arms 61a and 61b. However, the method of the present embodiment may be applied to the case in which the one product P is suctioned by three or more carrying-out arms or the case in which the one product P is suctioned by one carrying-out arm.

Further, in the example shown in FIG. 11, it is assumed that the carrying-out arms 61a and 61b suction the product P in a state in which the hole Pa is cut out inside the product P. However, a processing mode is also conceivable in which the hole Pa that exists inside the product P is not completely cut out and a joint portion is provided to leave a work area corresponding to the hole Pa. In this case, it is preferable that even the suction pad 62 existing in the hole Pa is handled as the effective suction pad 62a by the suction gravity center specifying unit 21b. However, if the suction pad 62 overlaps on a cutting line of the hole Pa excluding the joint portion, that suction pad 62 does not exhibit the suction force. Therefore, it is preferable to exclude such suction pad 62 from the effective suction pads 62a. Further, it is preferable that the product gravity center specifying unit 21a calculates the product gravity center assuming that the product P does not have the hole Pa inside. In order to perform such calculation, it is preferable to refer not only to the product data but also to the processing data of the product P.

According to the present embodiment, the suction gravity center specifying unit 21b changes the suction positions by moving the first and second carrying-out arms 61a and 61b back and forth and to the left and right, starting from the predetermined corner of the product, specifically, the left rear of the product on the product data. As a result, the calculation of the suction positions can be started from a position at which the product P can be most efficiently carried out in consideration of the movements of the first and second carrying-out arms 61a and 61b and the processing head 52a.

In the embodiment described above, the control data creation device 21 includes the product gravity center specifying unit 21a that specifies the product gravity center Pg based on the product data. However, the control data creation device 21 does not necessarily have to include the product gravity center specifying unit 21a. For example, when the product data created by the product data creation device 11 includes information on the product gravity center Pg, the control data creation device 21 can acquire the product gravity center Pg based on the product data. Therefore, the layout setting unit 21c can perform the necessary calculation by using the product gravity center Pg acquired from the product data. However, when the control data creation device 21 includes the product gravity center specifying unit 21a, the product gravity center can be specified based on not only the product data but also the processing data of the product P. Therefore, it is possible to specify the product gravity center Pg accurately in accordance with the shape of the product actually suctioned by the carrying-out arms 61a and 61b.

Second Embodiment

FIG. 13 is a block diagram showing a configuration of a control data creation device and a processing system according to a second embodiment. The control data creation device 21 according to the present embodiment is a device for creating the control data for the product carrying-out device 60 to take out and carry out the product P that is cut from the plate-like workpiece W by the processing machine 50. The product carrying-out device 60 is provided with carrying-out arms 65a, 65b, and 65c configured to be movable along the workpiece plane and provided with a plurality of suction pads 66 for suctioning the product P on the surface facing the workpiece W. The control data creation device 21 includes the specifying unit configured to change suction positions at which the carrying-out arms 65a, 65b, and 65c suction the product P by moving the carrying-out arms 65a, 65b, and 65c on the product data so as to specify the index for evaluating the suction state for each of the suction positions, and the layout setting unit 21c configured to create the control data in which the suction positions are laid out to the product P based on each index specified for each of the suction positions.

In the present embodiment, the specifying unit includes a suction force specifying unit 21d that specifies, as the index, a total suction force calculated from a set of the effective suction pads capable of suctioning the product P among the plurality of suction pads 66. The layout setting unit 21c creates the control data based on the suction position at which the total suction force is the largest.

The overall system that includes the control data creation device and the processing system will be described below. The overall system is mainly composed of the CAD 10, the CAM 20, the control device 30, and the processing system 40. Note that a description of the content that overlaps with that of the first embodiment will be omitted, and the description will focus on the difference.

The processing system 40 includes the processing machine 50 and the product carrying-out device 60.

The processing machine 50 is a laser processing machine including a laser processing unit 53. The laser processing unit 53 performs the laser cutting to the workpiece W by way of the laser beam.

Figure 14:
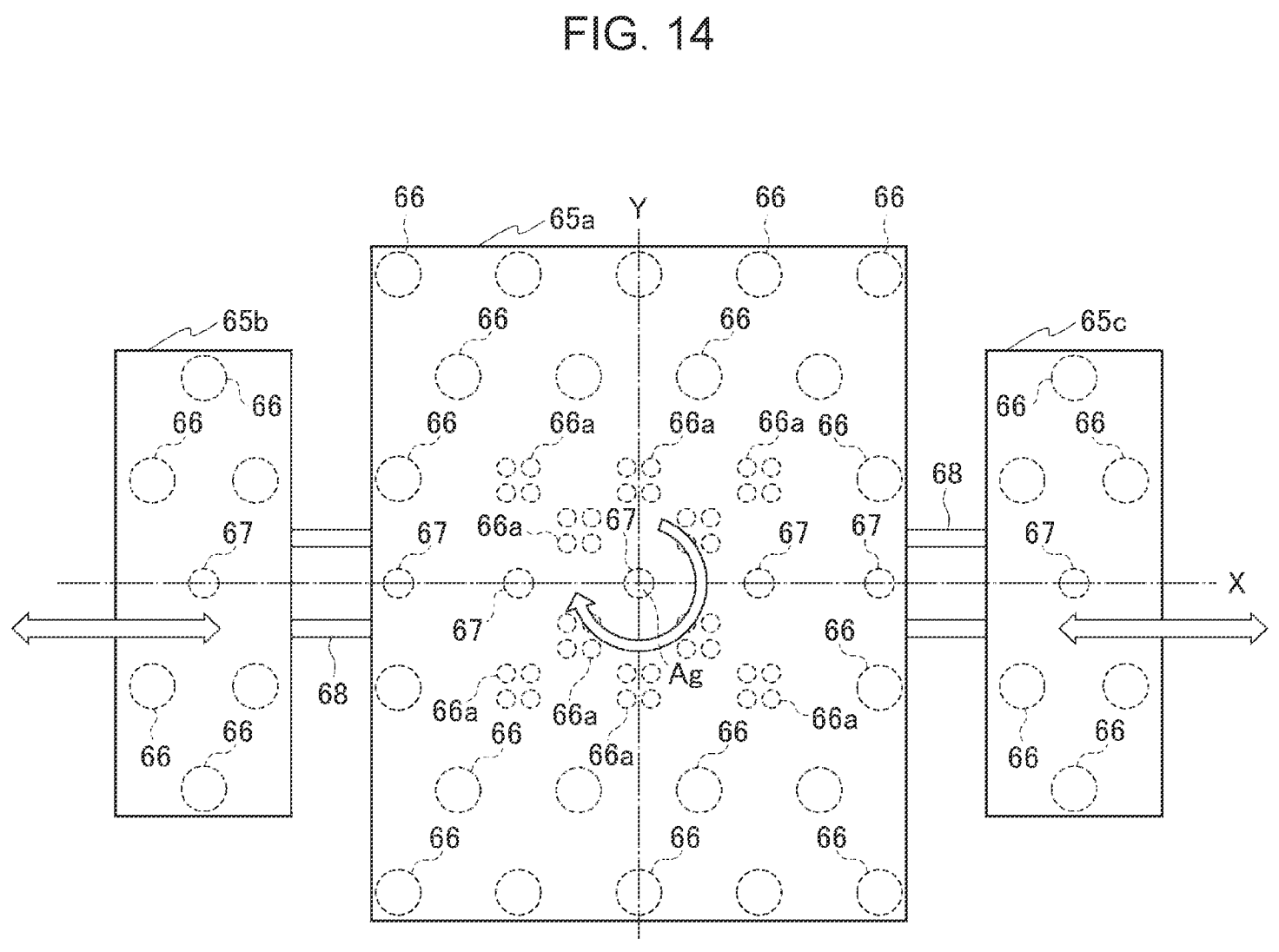

FIG. 14 is a diagram for illustrating the first, second, and third carrying-out arms that constitute the product carrying-out device. The product carrying-out device 60 is provided with the first, second, and third carrying-out arms 65a, 65b, and 65c that take out the product P after separating the product P, which is cut out from the workpiece W, from the residual workpiece material.

The first carrying-out arm 65a is the carrying-out arm having the largest area of the first, second, and third carrying-out arms 65a, 65b, and 65c. The second and third carrying-out arms 65b and 65c are respectively arranged on the both sides of the left and right with the first carrying-out arm 65a interposed therebetween. The first carrying-out arm 65a and the second and third carrying-out arms 65b and 65c are connected by a pair of extendable rods 68, respectively.

The extendable rod 68 can be in the most contracted state, the most extended state, and any state between these two states. When the extendable rod 68 is in the most contracted state, the second and third carrying-out arms 65*b* and 65*c* are each in a state of being adjacent to a side of the first carrying-out arm 65*a*, that is, in a closed state. On the other hand, when the extendable rod 68 is in the most extended state, the second and third carrying-out arms 65*b* and 65*c* are in a state of being separated from the first carrying-out arm 65*a* by a predetermined distance, that is, in an open state.

The first, second, and third carrying-out arms 65*a*, 65*b* and 65*c* are provided with the plurality of suction pads 66 for suctioning the product P. The plurality of suction pads 66 are arranged on surfaces facing the workpiece W in the first, second, and third carrying-out arms 65*a*, 65*b* and 65*c*. The suction pads 66 include a multi-pad 66*a* composed of a plurality of small-diameter pads whose suction on/off is synchronously controlled. Further, a plurality of sensors 67 are arranged side by side in the X-axis direction at the center in the Y-axis direction in the first, second, and third carrying-out arms 65*a*, 65*b*, and 65*c*. Each of the sensors 67 is a sensor for detecting the presence or the absence of the product P.

The first carrying-out arm 65*a* is configured to be movable in the X-axis, Y-axis, and Z-axis directions, respectively. Further, the first carrying-out arm 65*a* is rotatable in a horizontal plane around an arm center Ag that is a center position of the first carrying-out arm 65*a*, and can rotate horizontally within a range of 90 degrees for forward rotation and reverse rotation, respectively (a range of 180 degrees). The second and third carrying-out arms 65*b* and 65*c* are connected to the first carrying-out arm 65*a* via the extendable rod 68. Therefore, when the first carrying-out arm 65*a* moves and rotates, the entire first, second, and third carrying-out arms 65*a*, 65*b* and 65*c* move and rotate. Note that the arm center Ag is also a center position of the entire first, second, and third carrying-out arms 65*a*, 65*b* and 65*c*.

When the product P is carried out, under the control of the control device 30, the product carrying-out device 60 moves the first carrying-out arm 65*a* back and forth and to the left and right or rotates the first carrying-out arm 65*a* horizontally, thereby positioning the first, second, and third carrying-out arms 65*a*, 65*b* and 65*c* above the product P. Further, the product carrying-out device 60 extends and contracts the extendable rod 68 in accordance with the size of the product P so as to open and close the second and third carrying-out arms 65*b* and 65*c* with respect to the first carrying-out arm 65*a*. The product carrying-out device 60 suctions the product P by using the first, second, and third carrying-out arms 65*a*, 65*b*, and 65*c* so as to take out the product P after separating the product P from the residual workpiece material. The product carrying-out device 60 carries out the product P, which is taken out, to the stacking pallet (not shown) for the stacking.

The control data creation device 21 of the CAM 20, which is one of the features of the present embodiment, will be described below. The control data creation device 21 includes the product gravity center specifying unit 21*a*, the suction force specifying unit 21*d*, and the layout setting unit 21*c*. The product gravity center specifying unit 21*a* acquires the product data from the product data creation device 11. The product gravity center specifying unit 21*a* specifies the product gravity center that is the gravity center position of the product P based on the product data. The suction gravity center specifying unit 21*b* changes the suction positions at which the first, second, and third carrying-out arms 65*a*, 65*b* and 65*c* suction the product P while moving the first, second, and third carrying-out arms 65*a*, 65*b* and 65*c* on the product data. The suction gravity center specifying unit 21*b* specifies, for each of the suction positions, the effective suction pad capable of suctioning the product P from among the plurality of suction pads 66 so as to specify the total suction force calculated from the set of the effective suction pads. The layout setting unit 21*c* creates the control data in which the suction positions of the first, second, and third carrying-out arms 65*a*, 65*b*, and 65*c* are laid out to the product P based on the suction position at which the total suction force is the largest.

Figure 15:
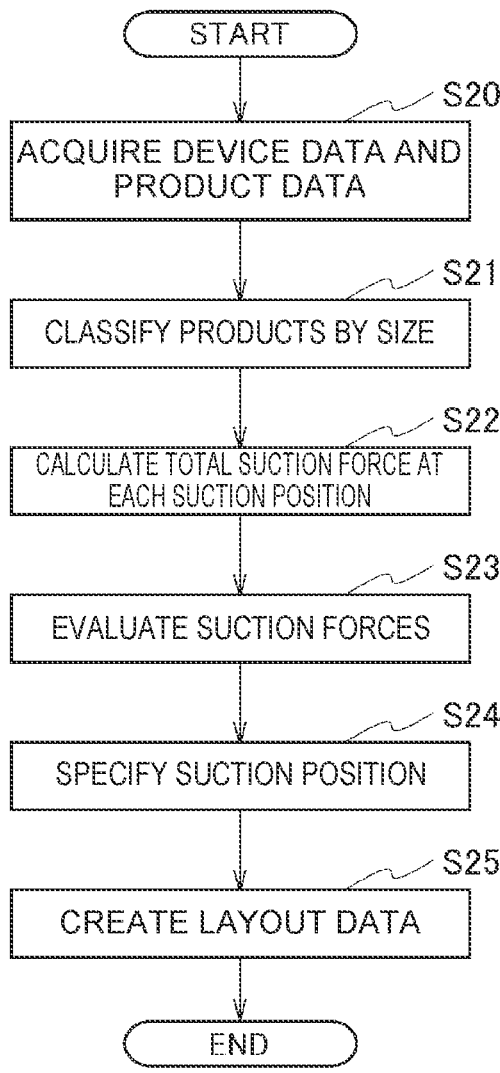
FIG. 15 is a flowchart showing a method of laying out the suction positions of the carrying-out arms to the product.
Figure 16:
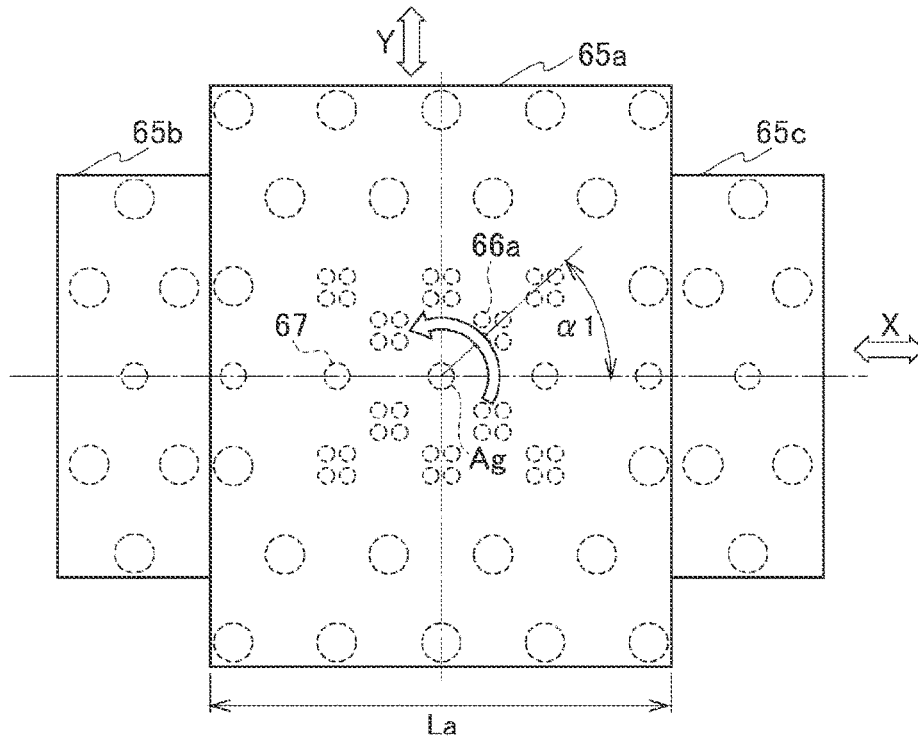
FIG. 16 is a diagram for illustrating a relation between a product size and a method of specifying the suction position.
Figure 17:
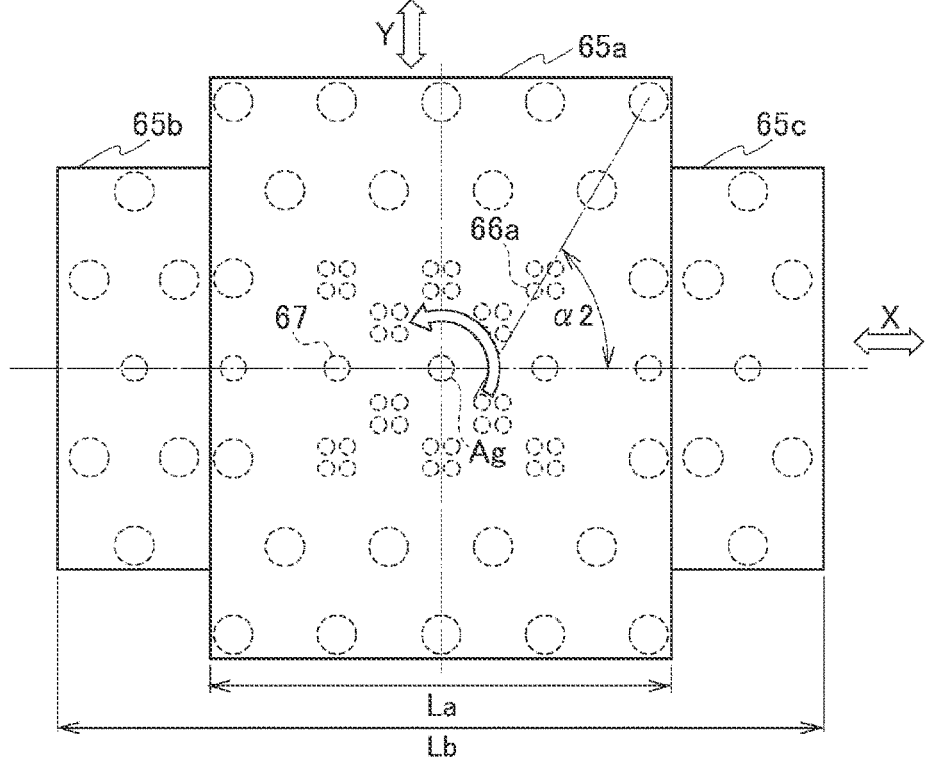
FIG. 17 is a diagram for illustrating the relation between the product size and the method of specifying the suction position.
Figure 18:
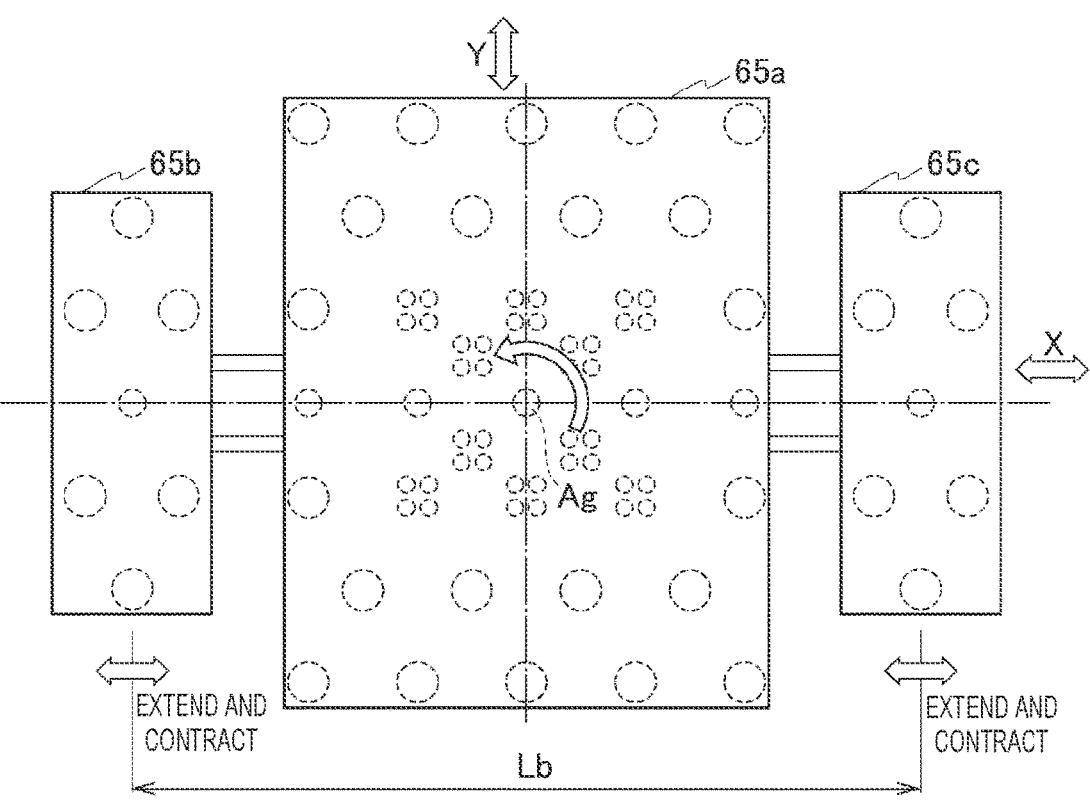
FIG. 18 is a diagram for illustrating the relation between the product size and the method of specifying the suction position.

Next, a procedure for the control data creation device 21 to create the control data will be described. FIG. 15 is a flowchart showing a method of laying out the suction positions of the carrying-out arms to the product. FIGS. 16 to 18 are diagrams for illustrating a relation between the product size and the method of specifying the suction position.

In step S20, the control data creation device 21 acquires the device data and the product data. The control data creation device 21 can recognize the number of the suction pads 66 provided to each of the carrying-out arms 65*a*, 65*b* and 65*c*, the position of each of the suction pads 66 on the arms, the pad diameter, and the like through the device data. Further, the control data creation device 21 can recognize the shape, the size, and the like of the product P through the product data.

In step S21, the control data creation device 21 classifies the products P by size. When the size of the workpiece W in the longitudinal direction is smaller than a first size La, the control data creation device 21 classifies the workpiece W as a small item. As shown in FIG. 16, the first size La corresponds to a size of the first carrying-out arm 65*a* in the direction in which the extendable rod 68 extends and contracts. If the size of the workpiece W in the longitudinal direction is equal to or greater than the first size La and less than a second size Lb, the control data creation device 21 classifies the workpiece W as a medium item. As shown in FIG. 17, the second size Lb corresponds to a size of the first, second, and third carrying-out arms 65*a*, 65*b* and 65*c* in the direction in which the extendable rod 68 extends and contracts in a state in which the extendable rod 68 is the most contracted. When the size of the workpiece W in the longitudinal direction is equal to or greater than the second size Lb, the control data creation device 21 classifies the workpiece W as a large item.

In step S22, the control data creation device 21 changes the suction positions of the first, second, and third carrying-out arms 65*a*, 65*b* and 65*c* on the product data so as to calculate the total suction force at each of the suction positions. In the calculation of the total suction force, the method of changing the suction positions is different depending on the classification of the product size.

Here, the total suction force is a sum of the suction forces obtained from the set of the effective suction pads in the first, second, and third carrying-out arms 65*a*, 65*b* and 65*c*. Note that the concept of the effective suction pad is the same as that in the first embodiment, and a detailed description thereof will be omitted.

The product P classified as the small item will be described below with reference to FIG. 16. The control data creation device 21 sets the suction position of the first carrying-out arm 65*a* to a reference position. The reference position is a position at which the arm center Ag, which is a center of the first carrying-out arm 65*a*, is made to coincide with the product gravity center Pg.

At this time, the second and third carrying-out arms 65*b* and 65*c* are in the closed state with respect to the first carrying-out arm 65*a*. Further, a rotational state of the first, second, and third carrying-out arms $65a$, $65b$, and $65c$ is assumed to be an initial state, that is, 0 degree (no rotation).

First, the control data creation device 21 calculates the total suction force at the reference position. Since the number of the effective suction pads is correlated with the total suction force, the calculation of the total suction force in the present embodiment is performed by counting the number of the effective suction pads.

Next, the control data creation device 21 moves the arm center Ag in the X-axis direction and the Y-axis direction, respectively, at a predetermined distance pitch of, for example, 1 mm, thereby changing the suction positions of the first, second, and third carrying-out arms $65a$, $65b$, and $65c$. The control data creation device 21 calculates each of the total suction forces at each of the suction positions. A range in which the arm center Ag is moved is a predetermined range around the product gravity center Pg, for example, a range of ±100 mm in the X-axis direction and ±100 mm in the Y-axis direction.

In addition to 0 degree, the control data creation device 21 sets two rotation patterns of a first angle $\alpha 1$ between 0 degree and 90 degrees, and 90 degrees so as to change, in each of the rotation patterns, the suction position in the X-axis direction and in the Y-axis direction as described above. Note that as shown in FIG. 16, the first angle $\alpha 1$ is an angle determined by a relation between the sensor 67 and the multi-pad $66a$, for example, 40.6 degrees.

The product P classified as the medium item will be described with reference to FIG. 17. The calculation of the total suction force for the product P of the medium item is the same as the calculation method in the product P of the small item described above, but the angle pattern is different.

Specifically, the control data creation device 21 sets four rotation patterns of 0 degrees, a positive second angle $\alpha 2$ between 0 degrees and 90 degrees, 90 degrees, a negative second angle $\alpha 2$ between 0 degrees and −90 degrees. Then, the control data creation device 21 changes the suction position in the X-axis and Y-axis directions as described above in each of the rotation patterns. As shown in FIG. 17, the second angle $\alpha 2$ is an angle determined by the relation between the sensor 67 and the multi-pad $66a$, for example, 59.72 degrees.

The product P classified as the large item will be described with reference to FIG. 18. The control data creation device 21 sets the suction position of the first carrying-out arm $65a$ to the reference position. The reference position is a position at which the arm center Ag, which is the center of the first carrying-out arm $65a$, is made to coincide with the product gravity center Pg.

At this time, the second and third carrying-out arms $65b$ and $65c$ are in the closed state with respect to the first carrying-out arm $65a$. Further, the rotational state of the first, second, and third carrying-out arms $65a$, $65b$, and $65c$ are assumed to be the initial state, that is, 0 degree (no rotation).

First, the control data creation device 21 calculates the total suction force at the reference position.

Next, the control data creation device 21 moves the arm center Ag in the X-axis direction and the Y-axis direction, respectively, at the predetermined distance pitch of, for example, 1 mm, thereby changing the suction positions of the first, second, and third carrying-out arms $65a$, $65b$, and $65c$. The control data creation device 21 calculates each of the total suction forces at the respective suction positions. The range in which the arm center Ag is moved is the predetermined range around the product gravity center Pg, for example, the range of ±100 mm in the X-axis direction and ±100 mm in the Y-axis direction.

The control data creation device 21 rotates the first carrying-out arm $65a$ in the positive direction and the negative direction, respectively, at a predetermined angular pitch of, for example, 1 degree for each of the XY patterns, thereby changing the suction positions of the first, second, and third carrying-out arms $65a$, $65b$ and $65c$. The range in which the rotation is performed is 50 degrees in the positive direction and 50 degrees in the negative direction with 0 degrees as the boundary.

Furthermore, in addition to the state in which the second and third carrying-out arms $65b$ and $65c$ are closed, the control data creation device 21 performs the calculation of the total suction force also in a state in which the second and third carrying-out arms $65b$ and $65c$ are opened while changing the suction positions in accordance with the XY pattern and the angle pattern described above. The state in which the second and third carrying-out arms $65b$ and $65c$ are opened refers to a state in which the second and third carrying-out arms $65b$ and $65c$ are opened up to a maximum position in accordance with the size of the product P, for example, up to a position −10 mm below an outer edge of the product P. Note that when the size from the second carrying-out arm $65b$ to the third carrying-out arm $65c$ is smaller than the size of the product P in the longitudinal direction in a state in which the extendable rod 68 is the most extended, the extendable rod 68 is set to the most open state. In this manner, in the present embodiment, the switching between opening and closing of the second and third carrying-out arms $65b$ and $65c$ is also included in the changing of the suction positions.

In step S23, the control data creation device 21 evaluates a plurality of the total suction forces calculated at the respective suction positions as described above. As described above, the control data creation device 21 calculates the number of the effective suction pads as the total suction force. Therefore, in step S23, the number of the effective suction pads is evaluated for each of the suction positions.

In step S24, the control data creation device 21 specifies the suction position at which the total suction force is the highest, that is, the number of the effective suction pads is the largest. Note that if there are the plurality of the suction positions at which the number of the effective suction pads is the largest, the control data creation device 21 specifies the suction position that satisfies any one or more of the conditions 1 to 3 shown below.

(1) The one at which the total suction force is the highest among the actually calculated total suction forces of the effective suction pads (2) The one having a large area obtained by summing the respective pad areas of the effective suction pads (3) The one at which the arm center Ag and the product gravity center Pg are close In step S25, the control data creation device 21 creates the control data by laying out the specified suction positions of the first, second, and third carrying-out arms $65a$, $65b$, and $65c$ to the product P.

When the control data is created in this manner, the control data creation device 21 creates the processing program based on the control data of the suction position and the processing data of the product P. The created processing program is used by the control device 30.

In the control data creation device 21 according to the present embodiment, the layout setting unit $21c$ creates the control data in which the suction positions of the first, second, and third carrying-out arms $65a$, $65b$, and $65c$ are laid out to the product P based on the total suction force specified for each of the suction positions.

According to this configuration, since the suction positions of the first, second, and third carrying-out arms 65a, 65b and 65c can be set in consideration of the total suction force, it is possible to suction the product P appropriately by the first, second, and third carrying-out arms 65a, 65b, and 65c. Since the product P can be appropriately suctioned, it is possible to carry out the product P stably without making the product P caught in the residual workpiece material.

According to the present embodiment, the layout setting unit 21c creates the control data based on the suction position at which the total suction force is the largest. As a result, it is possible to suction the product P at a position at which the largest total suction force can be obtained from the first, second, and third carrying-out arms 65a, 65b and 65c. Since the product P can be appropriately suctioned, it is possible to carry out the product P stably without making the product P caught in the residual workpiece material.

In the present embodiment, the suction force specifying unit 21d moves and rotates the first carrying-out arm 65a and moves the second and third carrying-out arms 65b and 65c by way of the extendable rod 68 on the product data so as to change the suction positions at which the first, second, and third carrying-out arms 65a, 65b and 65c suction the product P. Then, the suction force specifying unit 21d specifies the total suction force from the effective suction pads in the first, second, and third carrying-out arms 65a, 65b and 65c for each of the suction positions.

According to this configuration, it is possible to change the suction positions appropriately in consideration of the rotation and the extension and contraction operation of the first, second, and third carrying-out arms 65a, 65b and 65c. As a result, it is possible to perform the evaluation appropriately at each of the suction positions.

In the present embodiment, when the size of the product P in the longitudinal direction is less than the first size La, the suction force specifying unit 21d changes the suction positions by performing rotation processing of rotating the first, second, and third carrying-out arms 65a, 65b and 65c in the three angle patterns including 0 degrees, the first angle α1 between 0 degrees and 90 degrees, and 90 degrees and movement processing of moving the first, second, and third carrying-out arms 65a, 65b, and 65c back and forth and to the left and right at a predetermined movement pitch for each of the angle patterns.

According to this configuration, the suction position is changed such that the first carrying-out arm 65a covers entire area of the product P. As a result, the suction position of the first carrying-out arm 65a with respect to the product P can be appropriately changed.

In the present embodiment, when the size of the product P in the longitudinal direction is equal to or larger than the first size La and less than the second size Lb, the suction force specifying unit 21d changes the suction positions by performing rotation processing of rotating the first, second, and third carrying-out arms 65a, 65b, and 65c in the four angle patterns including 0 degrees, the positive second angle α2 between 0 degrees and 90 degrees, 90 degrees, and the negative second angle α2 between 0 degrees and −90 degrees and movement processing of moving the first, second, and third carrying-out arms 65a, 65b, and 65c back and forth and to the left and right at the predetermined movement pitch for each of the angle patterns in the state in which the arm center Ag is made to coincide with the product gravity center Pg.

According to this configuration, the suction positions are changed such that the first, second, and third carrying-out arms 65a, 65b and 65c cover the entire area of the product P. As a result, the suction positions of the first, second, and third carrying-out arms 65a, 65b and 65c with respect to the product P can be appropriately changed.

In the present embodiment, when the size of the workpiece in the longitudinal direction is equal to or larger than the second size, the suction force specifying unit 21d changes the suction positions by performing extension and contraction processing of moving the second and third carrying-out arms 65b and 65c with respect to the first carrying-out arm 65a in the two extension and contraction patterns including the state in which the extendable rod 68 is the most contracted and the state in which the extendable rod 68 is extended, movement processing of moving the first, second, and third carrying-out arms 65a, 65b and 65c back and forth and to the left and right at the predetermined distance pitch for each of the extension and contraction patterns, and rotation processing of rotating the first, second, and third carrying-out arms 65a, 65b and 65c at the predetermined angular pitch each time the first, second, and third carrying-out arms 65a, 65b and 65c are moved at the predetermined distance pitch in the state in which the arm center Ag is made to coincide with the product gravity center Pg.

According to this configuration, the suction positions are changed such that the first, second, and third carrying-out arms 65a, 65b and 65c cover the entire area of the product P by considering the opening and the closing of the second and third carrying-out arms 65b and 65c. As a result, the first, second, and third carrying-out arms 65a, 65b and 65c for the product P can be appropriately switched.

It should be noted that the first embodiment and the second embodiment each have a concept that is common to each other, and the technique shown in the respective embodiments can be mutually used.

Although the embodiments of the present disclosure have been described as above, the statements and drawings forming part of the embodiments should not be understood to limit the disclosure. From these embodiments, various alternative embodiments, examples, and operational techniques will become apparent to those skilled in the art.

The disclosure of the present application relates to the subject matter described in Japanese Patent Application No. 2021-079857 filed on May 10, 2021 and Japanese Patent Application No. 2022-052341 filed on Mar. 28, 2022, the entire disclosure of which is hereby incorporated by reference.

The invention claimed is:

1. A control data creation device for creating control data for a product carrying-out device to take out and carry out a product cut from a plate-shaped workpiece by a processing machine, the product carrying-out device being provided with a carrying-out arm configured to be movable along a workpiece plane and provided with a plurality of suction pads for suctioning the product on a surface of the carrying-out arm facing the workpiece, the carrying-out arm including:

a first carrying-out arm movable back and forth and to left and right along the workpiece plane; and a second carrying-out arm movable back and forth and to left and right along the workpiece plane;

the control data creation device comprising:

a memory storing instructions; and a hardware processor configured to execute the instructions to:

change a suction position at which the carrying-out arm suctions the product by moving the carrying-out arm on the product data so as to specify an index for evaluating a suction state for each suction position;

create the control data in which the suction position is laid out to the product based on each index specified for each suction position;

specify, as the index, a suction gravity center that is a gravity center position calculated from a set of effective suction pads capable of suctioning the product among the plurality of suction pads;

create the control data such that a distance between the suction gravity center and a product gravity center that is a gravity center position of the product is reduced;

change suction positions at which the first and second carrying-out arms suction the product by moving the first and second carrying-out arms on the product data;

specify the suction gravity center for each of the suction positions based on the effective suction pads in the first and second carrying-out arms; and change the suction positions by moving the first and second carrying-out arms back and forth and to left and right, starting from a predetermined corner portion of the product in the product data.

2. The control data creation device according to claim 1, wherein the hardware processor is configured to execute the instructions to create the control data based on the suction position at which the distance between the suction gravity center and the product gravity center is smallest.

3. The control data creation device according to claim 1, wherein the hardware processor is further configured to execute the instructions to specify a total suction force obtained from the set of effective suction pads for each suction position, and create the control data such that the distance between the suction gravity center and the product gravity center is reduced and the total suction force is increased.

4. The control data creation device according to claim 3, wherein when there are a plurality of the suction positions at which the distance between the suction gravity center and the product gravity center is smallest, the hardware processor is further configured to execute the instructions to create the control data based on the suction position at which the total suction force is largest among the plurality of the suction positions.

5. The control data creation device according to claim 3, wherein the hardware processor is further configured to execute the instructions to perform processing of specifying the suction gravity center for the suction position at which the total suction force is larger than a weight of the product.

6. The control data creation device according to claim 1, wherein the carrying-out arm is provided with a plurality of sensors for detecting the product on the surface facing the workpiece, and the hardware processor is further configured to execute the instructions to perform processing of specifying the suction gravity center for the suction position at which at least one sensor among the plurality of sensors can detect the product.

7. The control data creation device according to claim 1, wherein the hardware processor is further configured to execute the instructions to calculate a deflection amount generated in the product in a state of being suctioned by the carrying-out arm, and perform processing of specifying the suction gravity center for the suction position at which the deflection amount is within an allowable deflection amount set in advance.

8. The control data creation device according to claim 1, wherein the hardware processor is further configured to execute the instructions to specify, as the index, a total suction force calculated from a set of effective suction pads capable of suctioning the product among the plurality of suction pads, and the hardware processor is further configured to execute the instructions to create the control data based on the suction position at which the total suction force is largest.

9. The control data creation device according to claim 8, wherein the carrying-out arm includes:

a first carrying-out arm movable back and forth and to left and right along the workpiece plane and rotatable in a surface parallel to the workpiece plane; and second and third carrying-out arms respectively arranged on both sides of the first carrying-out arm interposed therebetween and connected to the first carrying-out arm via an extendable rod in a movable manner, and the hardware processor is further configured to execute the instructions to:

change suction positions at which the first, second, and third carrying-out arms suction the product by moving and rotating the first carrying-out arm on the product data and by moving the second and third carrying-out arms by the extendable rod on the product data, and specify the total suction force for each of the suction positions based on the effective suction pads in the first, second, and third carrying-out arms.

10. The control data creation device according to claim 9, wherein when a size of the first carrying-out arm in an extending and contracting direction of the extendable rod is a first size and a size of the product in a longitudinal direction is less than the first size, the hardware processor is further configured to execute the instructions to change the suction positions by performing:

rotation processing of rotating the carrying-out arm in three angle patterns including 0 degrees, a first angle between 0 degrees and 90 degrees, and 90 degrees in a state in which an arm center that is a center position of the carrying-out arm is made to coincide with a product gravity center that is a gravity center position of the product, and movement processing of moving the carrying-out arm back and forth and to left and right at a predetermined movement pitch for each of the angle patterns.

11. The control data creation device according to claim 10, wherein when a size of the first, second, and third carrying-out arms is a second size in the extending and contracting direction of the extendable rod in a state in which the extendable rod is the most contracted and the size of the product in the longitudinal direction is equal to or larger than the first size and less than the second size, the hardware processor is further configured to execute the instructions to change the suction positions by performing:

rotation processing of rotating the carrying-out arm in four angle patterns including 0 degrees, a positive second angle between 0 degrees and 90 degrees, 90 degrees, and a negative second angle between 0 degrees and −90 degrees in a state in which the arm center is made to coincide with the product gravity center, and movement processing of moving the carrying-out arm back and forth and to left and right at a predetermined movement pitch for each of the angle patterns.

12. The control data creation device according to claim 11, wherein when the size of the product in the longitudinal direction is equal to or larger than the second size, the hardware processor is further configured to execute the instructions to change the suction positions by performing:

extension and contraction processing of moving the second and third carrying-out arms with respect to the first carrying-out arm in two extension and contraction patterns including a state in which the extendable rod is the most contracted and a state in which the extendable rod is extended in a state in which the arm center is made to coincide with the product gravity center, movement processing of moving the carrying-out arms back and forth and to left and right at a predetermined distance pitch for each of the extension and contraction patterns, and rotation processing of rotating the carrying-out arms at a predetermine angular pitch each time the carrying-out arms is moved at the predetermined distance pitch.

13. The control data creation device according to claim 1, the hardware processor is further configured to execute the instructions to specify the product gravity center based on the product data including a shape of the product.

14. A control data creation device for creating control data for a product carrying-out device to take out and carry out a product cut from a plate-shaped workpiece by a processing machine, the product carrying-out device being provided with a carrying-out arm configured to be movable along a workpiece plane and provided with a plurality of suction pads for suctioning the product on a surface of the carrying-out arm facing the workpiece, the carrying-out arm including:

a first carrying-out arm movable back and forth and to left and right along the workpiece plane and rotatable in a surface parallel to the workpiece plane; and second and third carrying-out arms respectively arranged on both sides of the first carrying-out arm interposed therebetween and connected to the first carrying-out arm via an extendable rod in a movable manner the control data creation device comprising:

a memory storing instructions; and a hardware processor configured to execute the instructions to:

change a suction position at which the carrying-out arm suctions the product by moving the carrying-out arm on the product data so as to specify an index for evaluating a suction state for each suction position;

create the control data in which the suction position is laid out to the product based on each index specified for each suction position;

specify, as the index, a total suction force calculated from a set of effective suction pads capable of suctioning the product among the plurality of suction pads;

create the control data based on the suction position at which the total suction force is largest;

change suction positions at which the first, second, and third carrying-out arms suction the product by moving and rotating the first carrying-out arm on the product data and by moving the second and third carrying-out arms by the extendable rod on the product data;

specify the total suction force for each of the suction positions based on the effective suction pads in the first, second, and third carrying-out arms;

wherein when a size of the first carrying-out arm in an extending and contracting direction of the extendable rod is a first size and a size of the product in a longitudinal direction is less than the first size, the hardware processor is further configured to execute the instructions to change the suction positions by performing:

rotation processing of rotating the carrying-out arm in three angle patterns including 0 degrees, a first angle between 0 degrees and 90 degrees, and 90 degrees in a state in which an arm center that is a center position of the carrying-out arm is made to coincide with a product gravity center that is a gravity center position of the product, and movement processing of moving the carrying-out arm back and forth and to left and right at a predetermined movement pitch for each of the angle patterns.

15. The control data creation device according to claim 14, wherein when a size of the first, second, and third carrying-out arms is a second size in the extending and contracting direction of the extendable rod in a state in which the extendable rod is the most contracted and the size of the product in the longitudinal direction is equal to or larger than the first size and less than the second size, the hardware processor is further configured to execute the instructions to change the suction positions by performing:

rotation processing of rotating the carrying-out arm in four angle patterns including 0 degrees, a positive second angle between 0 degrees and 90 degrees, 90 degrees, and a negative second angle between 0 degrees and −90 degrees in a state in which the arm center is made to coincide with the product gravity center, and movement processing of moving the carrying-out arm back and forth and to left and right at a predetermined movement pitch for each of the angle patterns.

16. The control data creation device according to claim 15, wherein when the size of the product in the longitudinal direction is equal to or larger than the second size, the hardware processor is further configured to execute the instructions to change the suction positions by performing:

extension and contraction processing of moving the second and third carrying-out arms with respect to the first carrying-out arm in two extension and contraction patterns including a state in which the extendable rod is the most contracted and a state in which the extendable rod is extended in a state in which the arm center is made to coincide with the product gravity center, movement processing of moving the carrying-out arms back and forth and to left and right at a predetermined distance pitch for each of the extension and contraction patterns, and rotation processing of rotating the carrying-out arms at a predetermine angular pitch each time the carrying-out arms is moved at the predetermined distance pitch.

17. A method for creating control data for a product carrying-out device to take out and carry out a product cut from a plate-shaped workpiece by a processing machine, the product carrying-out device being provided with a carrying-out arm configured to be movable along a workpiece plane and provided with a plurality of suction pads for suctioning the product on a surface of the carrying-out arm facing the workpiece, the carrying-out arm including a first carrying-out arm movable back and forth and to left and right along the workpiece plane, and a second carrying-out arm movable back and forth and to left and right along the workpiece plane, the method comprising the steps of:

changing a suction position at which the carrying-out arm suctions the product by moving the carrying-out arm on the product data so as to specify an index for evaluating a suction state for each suction position;

creating the control data in which the suction position is laid out to the product based on each index specified for each suction position;

specifying, as the index, a suction gravity center that is a gravity center position calculated from a set of effective suction pads capable of suctioning the product among the plurality of suction pads;

creating the control data such that a distance between the suction gravity center and a product gravity center that is a gravity center position of the product is reduced;

changing suction positions at which the first and second carrying-out arms suction the product by moving the first and second carrying-out arms on the product data;

specifying the suction gravity center for each of the suction positions based on the effective suction pads in the first and second carrying-out arms; and changing the suction positions by moving the first and second carrying-out arms back and forth and to left and right, starting from a predetermined corner portion of the product in the product data.

* * * * *